United States Patent
Chen et al.

(10) Patent No.: US 7,431,824 B2
(45) Date of Patent: Oct. 7, 2008

(54) PROCESS FOR RECYCLING AN ACTIVE SLURRY CATALYST COMPOSITION IN HEAVY OIL UPGRADING

(75) Inventors: Kaidong Chen, Albany, CA (US); Julie Chabot, Novato, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 620 days.

(21) Appl. No.: 10/938,438

(22) Filed: Sep. 10, 2004

(65) Prior Publication Data

US 2006/0054533 A1    Mar. 16, 2006

(51) Int. Cl.
*C10G 47/02*    (2006.01)

(52) U.S. Cl. .................. 208/108; 208/143; 208/213; 208/254 H

(58) Field of Classification Search .............. None
See application file for complete search history.

(56) References Cited

U.S. PATENT DOCUMENTS

| | | | |
|---|---|---|---|
| 4,485,004 A | * | 11/1984 | Fisher et al. ............... 208/107 |
| 5,298,152 A | | 3/1994 | Kramer |
| 5,374,348 A | | 12/1994 | Sears et al. |
| 5,871,638 A | * | 2/1999 | Pradhan et al. ............ 208/422 |
| 6,620,313 B1 | * | 9/2003 | Demmin et al. ............ 208/112 |

* cited by examiner

*Primary Examiner*—Tam M Nguyen
(74) *Attorney, Agent, or Firm*—Penny L. Prater

(57) ABSTRACT

The instant invention is directed to a process employing slurry catalyst compositions in the upgrading of heavy oils. The slurry catalyst composition is not permitted to settle, which would result in possible deactivation. The slurry is recycled to an upgrading reactor for repeated use and products require no further separation procedures for catalyst removal.

15 Claims, 1 Drawing Sheet

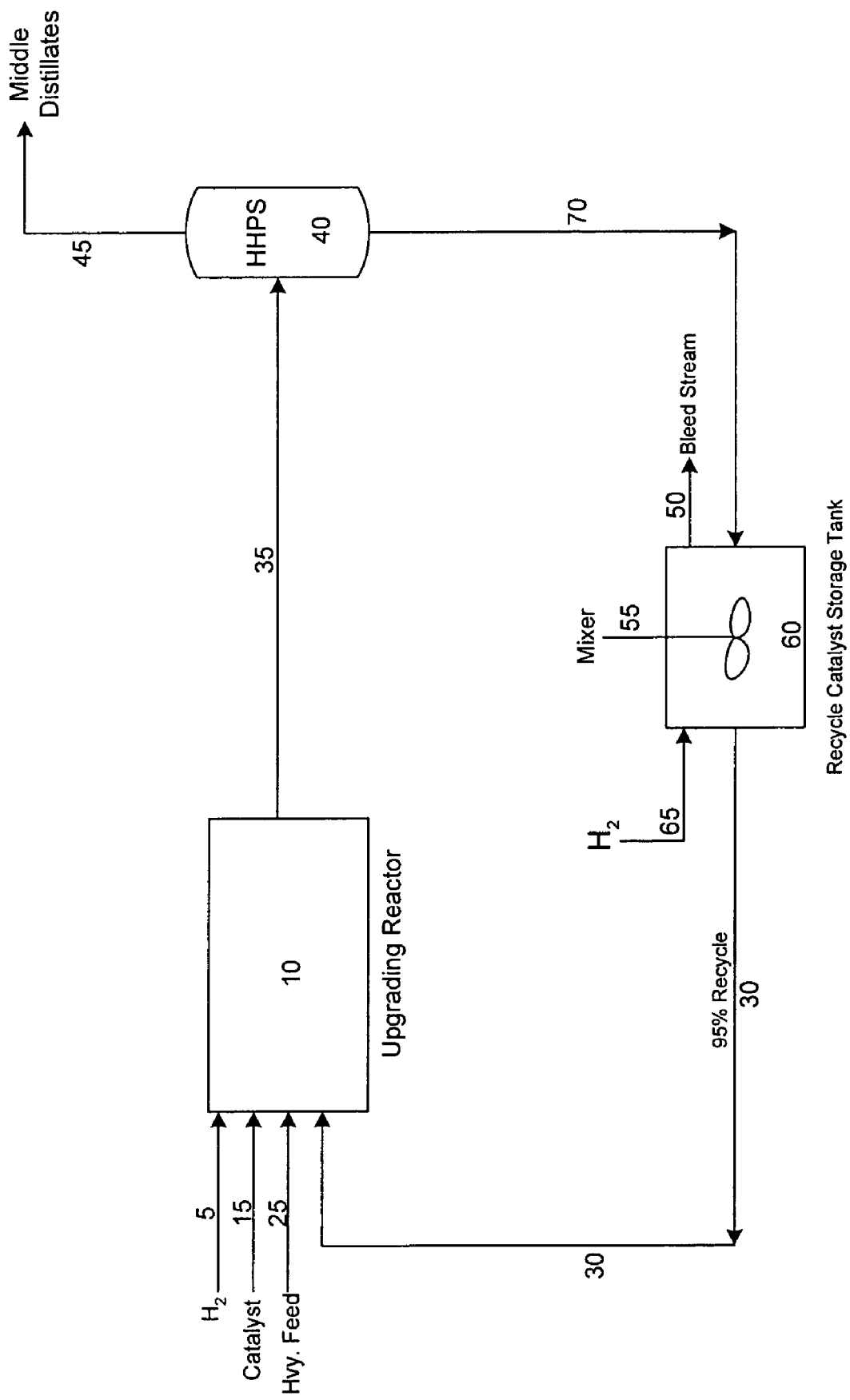

PROCESS FOR RECYCLING AN ACTIVE SLURRY CATALYST COMPOSITION IN HEAVY OIL UPGRADING

FIELD OF THE INVENTION

The present invention relates to a process employing slurry catalyst compositions in the upgrading of heavy oils. These oils are characterized by low hydrogen to carbon ratios and high carbon residues, as well as high asphaltene, nitrogen, sulfur and metal content.

BACKGROUND OF THE INVENTION

Slurry catalyst compositions used in heavy oil upgrading are generally not recycled, due to the particulate size which tends to range from 1 to 20 microns. The processes that attempt to recycle these catalyst particles tend to require multiple steps in the separation and concentration of the catalyst from the final products. The steps used are well known in the refining art. They include but are not limited to the following steps: solvent deasphalting, centrifugation, filtration, settling, distillation, and drying. Other equipment used in these steps may include and is not limited to use of hydrocyclones, extruders, and wiped film evaporators.

These catalyst particles tend to lose catalytic activity during the separation and concentration process steps. This is contrary to the purpose of recycling. This loss of catalytic activity is thought to be due to the precipitation onto the catalysts of polycondensates and coke. Polycondensates and coke are created by temperature and pressure reduction during the steps of catalyst separation and concentration. In slurry catalyst hydroprocessing, the costs of fresh catalyst must be weighed against the costs of catalyst separation, catalyst concentration, and catalyst rejuvenation.

U.S. Pat. No. 5,298,152 (which is incorporated by reference) teaches recycling to the hydrogenation zone of an active catalyst made from a catalyst precursor, without regeneration or further processing to enhance activity. While it is being separated from the product, the active catalyst is maintained under conditions substantially the same as the conditions encountered in the hydrogenation zone in order to avoid the precipitation of polycondensates and coke. In this way, the catalyst is not quickly deactivated, as often happens when it is separated from the product. Unlike the instant invention, Kramer teaches that a high pressure separator may act as a high pressure settler. In the instant invention, the catalyst is never permitted to settle.

U.S. Pat. No. 5,374,348 teaches a process of hydrocracking of heavy hydrocarbon oils in which the oil is mixed with a fractionated heavy oil recycle stream containing iron sulphate additive particles. The mixture is then passed upwardly through the reactor. Reactor effluent is passed into a hot separator vessel to obtain products and a liquid hydrocarbon stream comprising heavy hydrocarbons and iron sulphate particles. The heavy hydrocarbon stream is further fractionated to obtain a heavy oil boiling above 450° C., which contains the additive particles. This material is recycled back to the hydrocracking reactor.

SUMMARY OF THE INVENTION

The instant invention is directed to a process for hydroconversion of heavy oils, employing an active slurry catalyst composition.

A process for upgrading heavy oils which employs a slurry catalyst composition that is not allowed to settle, comprising the following steps:

(a) combining, in an upgrading reactor under hydroprocessing conditions, heavy feed, hydrogen gas, fresh catalyst slurry composition, and recycle slurry composition;
(b) passing the effluent of the upgrading reactor to a separation zone wherein products boiling at temperatures up to 900° F. are passed overhead;
(c) passing the material remaining in the separation zone from step (b) to a constantly stirred catalyst storage tank; and
(d) passing at least a portion of the material in the constantly stirred catalyst storage tank back to the upgrading reactor of step (a).

Advantages of the instant invention include:

Prevention of catalyst agglomeration (a source of catalyst deactivation) by not permitting catalyst to settle.
Removal overhead of middle distillate product from hydrogenation zone (as gas vapor from hot high pressure separator).
Catalyst-fee product from the hydrogenation zone (no requirement of settling, filtration, centrifugation, etc.).
No significant deactivation of catalyst when there is substantial pressure and/or temperature drop due to the 100% conversion.
Production in very low amounts of supercondensates (asphaltenes) and coke that do not significantly affect the activity of the catalyst composition.
Concentration of catalyst in the separation step—no further concentration required.

BRIEF DESCRIPTION OF THE FIGURE

The FIGURE illustrates the process steps of the instant invention.

DETAILED DESCRIPTION OF THE INVENTION

The instant invention is directed to a process for hydroconversion of heavy oils, employing an active slurry catalyst composition such as those disclosed in co-pending applications T-6344 (Ser. No. 10/938,202) and T-6393 (Ser. No. 10/938,003). These applications are incorporated by reference. Such catalyst compositions comprise a Group VIB metal compound such as molybdenum. A slurry catalyst composition can be recycled, using only a single separation step, without significant catalyst deactivation occurring. The single separation step preferably employs a hot, high pressure separator.

The slurry catalyst composition is useful for upgrading carbonaceous feedstocks, which include atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulphurization, hydrodenitrification, and hydrodemetalization. The catalyst may be used in processes employing both fixed and ebullated beds.

The process of the present invention can be operated in either one or two stage modes. The upgrading reactor 10 (see FIGURE) represents only the first stage. The second stage (if present), which may be an integrated hydrotreater, is not shown in the FIGURE. In one-stage operation, the heavy oil feed (line 25) is contacted with the active catalyst slurry and a hydrogen-containing gas (line 5) at elevated temperatures and pressures in continuously stirred tank reactors or ebullated bed catalytic reactors. The active catalyst slurry is composed of up to 95 wt % recycle material (line 30) and 5 wt % fresh catalyst (line 15). The feed, catalyst slurry and hydrogen-containing gas are mixed in upgrading reactor 10 at a residence time and temperature sufficient to achieve measurable thermal cracking rates.

The effluent from the upgrading reactor 10 passes through line 35 to the hot high pressure separator 40. The resultant light oil is separated from solid catalyst and unconverted heavy oil in the hot high pressure separator 40, and passes through line 45 to middle distillate storage. Alternately, the light oil may be sent to the second-stage reactor (not shown). This reactor is typically a fixed bed reactor used for hydrotreating of oil to further remove sulfur and nitrogen, and to improve product qualities. The product is free of catalyst and does not require settling, filtration, centrifugation, etc.

In the hot high pressure separator 40, substantially all of the upgraded products generated from the heavy oil hydroconversion upgrading zone 10 goes overhead as gas-vapor stream 45. The liquid in the bottom of the hot high pressure separator 40, composed primarily of unconverted oil and active catalyst, is passed through line 70 to the recycle catalyst storage tank 60. This tank is constantly stirred, as depicted by Mixer 55, and a constant reducing atmosphere is maintained by the addition of hydrogen (line 65). Excess hydrogen may be removed by bleed stream 50. The catalyst slurry is recycled back to upgrading reactor 10 as needed (through line 30). Recycle makes up can be as high as 95 wt % of the catalyst used in the upgrading reactor.

The catalyst activity is maintained by running the upgrading process at 100% conversion, maintaining an at least minimum reducing atmosphere throughout the upgrading, separation and storage, and not allowing the catalyst composition to settle at any time. Following the separation in the hot high pressure separator, there is no need for further separation steps. Throughout the process, substantial temperature and pressure fluctuations are tolerated with only minor precipitate formation of supercondensates and coke. In past processes in which recycle has been employed, the slurry catalyst composition has sustained substantial fouling and deactivation.

Process Conditions

For the first-stage operation as depicted in upgrading reactor 10, the temperatures for heavy oil feedstocks are normally above about 700° F., preferably above 750° F., and most preferably above 800° F. in order to achieve high conversion. Hydrogen partial pressures range from 350 to 4500 psi and hydrogen to oil ratio is from 500 to 10,000 SCFB. The concentration of the active slurry catalyst in the heavy oil is normally from about 100 to 20,000 ppm expressed as weight of metal (molybdenum) to weight of heavy oil feedstock. Typically, higher catalyst to oil ratio will give higher conversion for sulfur, nitrogen and metal removal, as well as the higher cracking conversion. The high pressure separator temperature can be as high as 800° F. Near 100% demetalation conversion and 1000° F.+ cracking conversion of the heavy oil can be achieved at appropriate process conditions, while the coke yield can be maintained at less than about 1%.

The process conditions for the second-stage (not shown in the FIGURE) are typical of heavy oil hydrotreating conditions. The second-stage reactor may be either a fixed, ebullated or a moving bed reactor. The catalyst used in the second-stage reactor is a hydrotreating catalyst such as those containing a Group VIB and/or a Group VIII metal deposited on a refractory metal oxide. By using this integrated hydrotreating process, the sulfur and nitrogen content in the product oil can be very low, and the product oil qualities are also improved.

EXAMPLES

Example 1

This example depicts heavy oil upgrading (Athabasca vacuum residuum) in recycle mode. The catalyst is activated by using the method disclosed in co-pending application Ser. No. 10/938,003(T-6393). This catalyst is activated using only a single oil.

The catalyst prepared by the method of T-6393 was used for Athabasca vacuum resid (VR) and vacuum gas oil (VGO) feed upgrading in a process unit which employed two continuously stirred tank reactors. Catalyst was recycled with unconverted heavy oil. A feed blend with 97% Athabasca VR and 3% Athabasca VGO was used.

The Athabasca VR feed properties are listed in the following table:

| | |
|---|---|
| API gravity at 60/60 | 3.9 |
| Sulfur (wt %) | 5.58 |
| Nitrogen (ppm) | 5770 |
| Nickel (ppm) | 93 |
| Vanadium (ppm) | 243 |
| Carbon (wt %) | 83.57 |
| Hydrogen (wt %) | 10.04 |
| MCRT (wt %) | 17.2 |
| Viscosity @ 212° F. (cSt) | 3727 |
| Pentane Asphaltenes (wt %) | 13.9 |
| Fraction Boiling above 1050° F. (wt %) | 81 |

The Athabasca VGO feed properties are listed in the following table:

| | |
|---|---|
| API gravity at 60/60 | 15.6 |
| Sulfur (wt %) | 3.28 |
| Nitrogen (ppm) | 1177 |
| Carbon (wt %) | 85.29 |
| Hydrogen (wt %) | 11.01 |
| MCRT (wt %) | 0.04 |
| Fraction Boiling above 650° F. (wt %) | 85 |

The process conditions used for the heavy oil upgrading is listed as following:

| | |
|---|---|
| Total pressure (psig) | 2500 |
| Fresh Mo/Fresh Oil ratio (%) | 0.24 |
| Fresh Mo/Total Mo ratio | 0.1 |
| Fresh oil/Total oil ratio | 0.75 |
| Total feed LHSV | 0.21 |
| Reactor temperature (°F.) | 825 |
| $H_2$ gas rate (SCF/B) | 9100 |

The product yields, properties and conversion are listed in the following table:

| | |
|---|---|
| C4-gas (wt %) | 12.1 |
| C5-180° F. (wt %) | 7.5 |
| 180-350° F. (wt %) | 15.5 |
| 350-500° F. (wt %) | 20.8 |
| 500-650° F. (wt %) | 22.2 |
| 650-800° F. (wt %) | 14.8 |
| 800-1000° F. (wt %) | 3.9 |
| 1000° F.+ (wt %) | 0.3 |
| HDN conversion (%) | 62 |

| | |
|---|---|
| HDS conversion (%) | 94 |
| HDM conversion (%) | 99 |
| Liquid product API gravity | 33 |

Middle distillates compose 58.5 wt % of the product and heteroatom content is drastically reduced.

Example 2

This example depicts heavy oil upgrading (Hamaca vacuum residuum) in recycle mode. The catalyst is activated by using the method disclosed in co-pending application Ser. No. 10/938,003 (T-6393). This catalyst is activated using only a single oil.

The catalyst by the method of T-6393 was used for Hamaca vacuum resid (VR) and vacuum gas oil (VGO) feed upgrading in a process unit which contains two continuously stirred tank reactors, and a recycle portion which enables recycling catalyst with unconverted heavy oil. A feed blend with 90% Hamaca VR and 10% Hamaca VGO was used.

The Hamaca VR feed properties are listed in the following table:

| | |
|---|---|
| API gravity at 60/60 | 1.7 |
| Sulfur (wt %) | 4.56 |
| Nitrogen (ppm) | 9222 |
| Nickel (ppm) | 168 |
| Vanadium (ppm) | 714 |
| Carbon (wt %) | 83.85 |
| Hydrogen (wt %) | 9.46 |
| Viscosity @ 266° F. (cSt) | 19882 |
| Pentane Asphaltenes (wt %) | 32 |
| Fraction Boiling above 1050° F. (wt %) | 91 |

The Hamaca VGO feed properties are listed in the following table:

| | |
|---|---|
| API gravity at 60/60 | 14.2 |
| Sulfur (wt %) | 3.53 |
| Nitrogen (ppm) | 2296 |
| Carbon (wt %) | 84.69 |
| Hydrogen (wt %) | 11.58 |
| Fraction Boiling above 650° F. (wt %) | 89 |

The process conditions used for the heavy oil upgrading is listed as following:

| | |
|---|---|
| Total pressure (psig) | 2600 |
| Fresh Mo/Fresh Oil ratio (%) | 0.55 |
| Fresh Mo/Total Mo ratio | 0.25 |
| Fresh oil/Total oil ratio | 0.75 |
| Total feed LHSV | 0.16 |
| Reactor temperature (°F.) | 825 |
| H2 gas rate (SCF/B) | 9400 |

The product yields, properties and conversion are listed in the following table:

| | |
|---|---|
| C4- gas (wt %) | 14 |
| C5-180° F. (wt %) | 6.6 |
| 180-350° F. (wt %) | 15.4 |
| 350-500° F. (wt %) | 21.1 |
| 500-650° F. (wt %) | 22.4 |
| 650-800° F. (wt %) | 12.6 |
| 800-1000° F. (wt %) | 4 |
| 1000° F.+ (wt %) | 1.5 |
| HDN conversion (%) | 63 |
| HDS conversion (%) | 96 |
| HDM conversion (%) | 99 |
| Liquid product API gravity | 33 |

Middle distillates compose 58.9 wt % of the product and heteroatom content is drastically reduced.

What is claimed is:

1. A process for upgrading heavy oils which employs a slurry catalyst composition, comprising the following steps:
 (a) combining, in an upgrading reactor under hydroprocessing conditions, heavy feed, hydrogen gas, fresh catalyst slurry composition, and recycle slurry composition;
 (b) passing the effluent of the upgrading reactor to a separation zone wherein products boiling at temperatures up to 900° F. are passed overhead and wherein the slurry catalyst is not allowed to settle;
 (c) passing the material remaining in the separation zone from step (b) to a constantly stirred catalyst storage tank; and
 (d) passing at least a portion of the material in the constantly stirred catalyst storage tank back to the upgrading reactor of step (a).

2. The process of claim 1, wherein the heavy feed is selected from the group consisting of atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers.

3. The process of claim 1, wherein the upgrading process is selected from the group consisting of thermal hydrocracking, hydrotreating, hydrodesulphurization, hydrodenitrification, and hydrodemetalization.

4. The process of claim 1, wherein the separation zone is a hot high pressure separator.

5. The process of claim 1, wherein at least 50 wt % of the products boil in the range between 180° F. and 650° F.

6. The process of claim 1, wherein the upgrading reactor is a constant stirred tank reactor or ebullating bed.

7. The process of claim 1, wherein recycle slurry catalyst composes up to 95 wt % of the catalyst used in the upgrading reactor.

8. The process of claim 1, wherein hydroprocessing conditions comprise temperatures greater than 750° F., hydrogen partial pressures in the range from 350 to 4500 psi, and a hydrogen to oil ratio in the range from 500 to 10,000 SCFB.

9. The process of claim 1, wherein the concentration of active slurry catalyst in the heavy oil is normally from about 100 to 20,000 ppm expressed as weight of metal (molybdenum) to weight of heavy oil feedstock.

10. The process of claim 1, wherein the products boiling below 900° F. require no further separation procedures for the removal of catalyst.

11. The process of claim 1, wherein the products boiling below 900° F. may be further upgraded for the removal of heteroatoms.

12. The process of claim 10, wherein the upgrading occurs in a reactor selected from the group consisting of moving bed reactors, ebullated bed reactors, and fixed bed reactors.

13. The process of claim 12, wherein the upgrading occurs in a fixed bed reactor.

14. The process of claim 1, wherein demetalation conversion is about 99%.

15. The process of claim 1, wherein coke yield is less than about 1%.

* * * * *